United States Patent
Sengiku et al.

(10) Patent No.: US 9,692,271 B2
(45) Date of Patent: Jun. 27, 2017

(54) ELECTRIC MOTOR

(71) Applicant: MAKITA CORPORATION, Anjo-shi, Aichi (JP)

(72) Inventors: Hitoshi Sengiku, Anjo (JP); Youko Tomita, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 163 days.

(21) Appl. No.: 14/642,132

(22) Filed: Mar. 9, 2015

(65) Prior Publication Data

US 2015/0263579 A1    Sep. 17, 2015

(30) Foreign Application Priority Data

Mar. 17, 2014   (JP) ................................ 2014-053378

(51) Int. Cl.
*H02K 3/52*   (2006.01)

(52) U.S. Cl.
CPC .............. *H02K 3/522* (2013.01); *H02K 3/52* (2013.01); *H02K 3/521* (2013.01); *H02K 2203/09* (2013.01); *H02K 2213/03* (2013.01)

(58) Field of Classification Search
CPC .................................. H02K 3/52; H02K 3/522
See application file for complete search history.

(56) References Cited

U.S. PATENT DOCUMENTS

2006/0033395 A1*   2/2006   Izumi ................... H02K 3/522
                                                      310/208

FOREIGN PATENT DOCUMENTS

| JP | S62-132651 U | 8/1987 |
| JP | S62-178756 U | 11/1987 |
| JP | 2005-341640 A | 12/2005 |
| WO | 2010/087235 A1 | 8/2010 |

OTHER PUBLICATIONS

May 12, 2016 Extended Search Report issued in European Patent Application No. 15158816.7.

* cited by examiner

*Primary Examiner* — Dang Le
(74) *Attorney, Agent, or Firm* — Oliff PLC

(57) ABSTRACT

An electric motor has a stator positioned lengthwise within and fixed to a case. The stator has a stator core, a coil wound around a tooth extending from the stator core, and an insulating member attached to the stator core wherein the insulating member is configured to insulate the coil from the stator core. A wire holding part extends from the insulating member to hold a wire within an outer diameter of the insulating member. A rotor is positioned lengthwise along an inner circumference of the stator wherein the rotor is configured to rotate about a motor axis extending lengthwise across the electric motor.

20 Claims, 9 Drawing Sheets

ELECTRIC MOTOR

This application claims priority to Japanese patent application Serial Number 2014-53378, filed on Mar. 17, 2014, the contents of which are incorporated herein by reference in their entirety.

BACKGROUND

Field

The present invention generally relates to an electric motor used to provide power to drive an electric power tool such as an electric disc grinder. More particularly, embodiments of the present invention relate to a rotary electric motor with rotor positioned lengthwise within a tubular stator.

Background Art

Electric motors configured to power portable tools may generally include a rotor positioned lengthwise within a tubular stator. Several relatively thin laminated steel sheets may form a core of the stator. The stator may also have several electric and/or magnetic coils, each of which may be wound in a loop shape and be positioned, for example, to face other coils. Further, an insulating member made from resin, for example, may be attached to both ends of the stator core. Moreover, a lead wire may connect to each of the coils through the insulating member. The lead wire may be inserted into a corresponding insertion port located in the insulating member to electrically connect to an end part of one or more coils as described above. The lead wire, connected to the coils, may be fixed to the stator at a position near the insertion port to, for example, prevent the lead wire from inadvertently slipping off and to otherwise maintain a stable connection state between the lead wire and the coils. Conventionally, to fix the lead wire to the coils of the stator, the lead wire may be bundled with a string. However, the bundling of the lead wire with a string may be troublesome, time-consuming and/or otherwise add to the overall complexity of using the electric motor. For example, Japanese Laid-Open Utility Model Application No. S62-132651, which relates to a simplified technique for holding a lead wire, may use a lead-wire-holding member located in an insulating member where the lead wire may be held along an inner circumference of the stator core. Further, the aforementioned Japanese Laid-Open Utility Model Application No. S62-132651 may also disclose that a holding member for holding the lead wire such as a clip may be attached to a side of the stator core to holding the lead wire.

However, according to the lead-wire-holding structure as discussed above, one or more lead wires may be held along the inner circumference of the stator core, thus contributing toward crowding and/or cramping of the lead wires along the wiring path. Such crowding of the lead wires along the wiring path as described here may add to the overall complexity and/or difficulty of operating the electric motor. Moreover, space occupied by the stator core may increase proportionate to the width of the lead-wire-holding member that attached to a side of the stator core, as described above. Thus, the resultant bulk of the stator core with the lead-wire-holding member attached thereof may impair movement and/or manipulation of the stator with respect to a case of an electric power tool. In view of the difficulties in operating a bulky stator core as described, there is a need in the art to permit for convenient attachment of lead wires to the stator core without increasing the overall bulk of the stator core. Also, there is a need in the art to simplify the work needed to hold the lead wire and/or other wiring components associated thereof to the stator.

SUMMARY

The present invention relates to an electric motor with a stator fixed to a case. The stator may have a stator core, a coil wound around one or more teeth of the stator core, and an insulating member to insulate the coil from the stator core. The electric motor may also have a rotor positioned lengthwise within the stator where the rotor rotates around a defined motor axis. The insulating member may attach to an end of the stator core in a motor axis direction. Further, the insulating member may have a lead wire holding part to hold a lead wire in place relative to an outer diameter of the insulating member when viewed from the motor axis direction. Thus, the overall volume occupied by the electric motor may be minimized due to the construction and/or configuration of the stator and lead wire holding part as described above. Likewise, effort needed to position and/or hold the lead wires in place relative to the insulating member may be minimized as well.

In an embodiment, the insulating member may have a lead wire connecting part where an end part of the lead wire may electrically connect to the coil. Thus, effort needed to connect the lead wires to the coil may be reduced.

In an embodiment, the lead wire holding part may be a clip-type member that extends outwardly in the radial direction from the stator core. Further, the lead wire may engage with the lead wire holding part in the radial direction to generally be held in place as needed. Because of this construction, effort associated with connecting and holding the lead wires may be minimized.

In an embodiment, the lead wire holding part may include a coil regulating part to control the position of the coil relative to the motor axis direction. Also, the lead wire holding part may have a holding part configured to fit and/or hold the lead wire between the holding part and the coil regulating part. Moreover, the holding part may be positioned to face the coil regulating part in, for example, the motor axis direction. Further, the lead wire holding part, the holding part, and the coil regulating part may function independently and/or collectively as, for example, a click type member. As a result, the lead wires may be engaged between the coil regulating part and the holding part as needed to thus reduce effort needed to hold the lead wire in place.

In an embodiment, the lead wire holding part may have a loop-shaped member to hold the lead wire within an inner circumference thereof. As discussed here, the loop-shaped member may serve as a lead wire holding part instead of, for example, the clip-type lead wire holding part. The lead wires may thread through the loop-shaped member. Thus, the effort needed to hold the lead wires in place may be reduced. Further, the lead wires may be reliably held in place as needed.

In an embodiment, the loop-shaped member may be configured to open and close to simplify holding the lead wires in place relative to the lead wire holding part and/or stator core as needed. Thus, the effort to hold the lead wires in place may be further reduced.

In an embodiment, the lead wire holding part may be configured to hold more than one lead wire. As a result, the lead wires may be arranged in an orderly fashion.

In an embodiment, the lead wire holding part may be integrally formed with an insulating member to reduce the overall complexity of the electric motor. Thus, fewer components may be needed to assemble the electric motor. As a result, the electric motor may be more easily assembled and/or manufactured.

In an embodiment, the electric motor may provide power to an electric power tool. Specifically, the electric motor may be configured to provide power to electric power tools such as disc grinders and/or screwdrivers.

DETAILED DESCRIPTION

The detailed description set forth below, when taken in connection with the appended drawings, is intended to be a description of exemplary embodiments of the present invention and is not intended to be restrictive and/or to represent the only embodiments in which the present invention can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. It will be apparent to those skilled in the art that the exemplary embodiments of the invention may be practiced without these specific details. In some instances, well-known structures, components and/or devices are shown in block diagram form in order to avoid obscuring the novelty of the exemplary embodiments presented herein.

Figure 1:
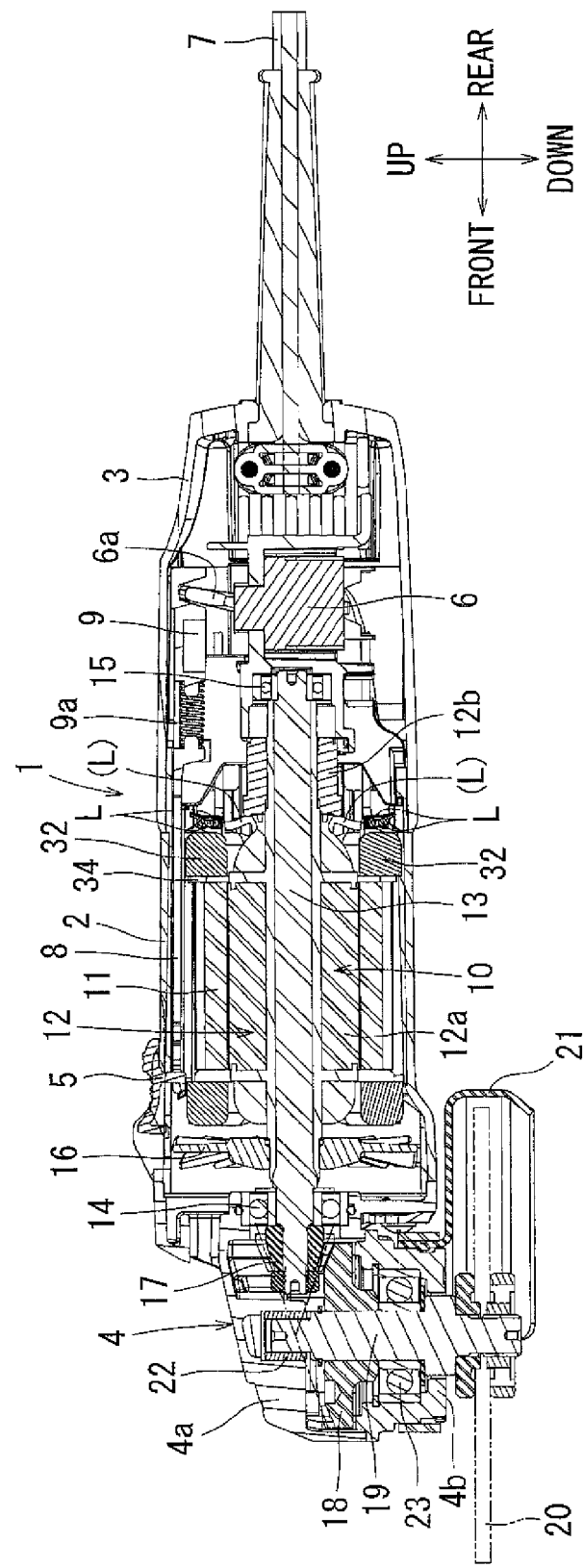
FIG. 1 illustrates a longitudinal sectional view of an electric power tool such as a disc grinder, where an electric motor in accordance with an embodiment of the present invention is incorporated as a driving source.

Generally referring to FIGS. 1 to 17, embodiments of the present invention will be explained below in further detail. As shown in FIG. 1, an electric motor 10 may be incorporated into an electric power tool 1 to, for example, generally power the electric power tool 1 as needed. In detail, FIG. 1 shows the electric power tool 1 as a disc grinder. Further, the electric power tool 1 may have a tubular main case 2 housing the electric motor 10 that may drive other components within the tubular main case 2 to operate the electric power tool 1 as needed. Also, as shown in FIG. 1, a gear head 4 may connect to a front part of the main case 2 and a rear case 3 may connect to a rear part of the main case 2. The main case 2 may also function as a grip able to be held by, for example, a user and/or an operator. Further, a start switch 5 that may be activated and/or operable by sliding a fingertip of the user's hand, for example, may be positioned on an upper front face of the main case 2.

As shown in FIG. 1, a main switch 6 may be located inside the rear case 3. The start switch 5, as described above, and a switch lever 6a of the main switch 6 may link to the main switch 6 via an elongated slide bar 8 and an actuating bar 9. The slide bar 8 and the actuating bar 9 may both be configured to slide along an inner face of the main case 2. In detail, the slide bar 8 may be positioned adjacent to and/or outside the electric motor 10 in the radial outward direction. Specifically, the slide bar 8 may be positioned outside a stator core 31 and insulating members 33, 34 in the radial direction. Further, and as described earlier, the slide bar 8 may slide in the front-rear direction. A front-end part of the slide bar 8 may link to a bottom face of the start switch 5. Likewise, a rear part of the actuating bar 9 may link to the switch lever 6a of the main switch 6. Further, a tension spring 9a may insert between the rear part of the slide bar 8 and the front part of the actuating bar 9. The tensioning spring 9 may be configured to have a pre-set bias, for example, to cause and/or assist the slide bar 8 to slide toward the rear and/or the actuating bar 9 to slide toward the front.

The start switch 5 may be switched on or off to, for example, correspondingly move the slide bar 8 and/or the actuating bar 9 to switch the main switch 6 on or off. In detail, and as shown in FIG. 1, sliding the start switch 5 toward the front may pull and/or move the slide bar 8 and the actuating bar 9 toward the front via the tensioning spring 9a. Pulling the actuating bar 9 toward the front may correspondingly tilt the switch lever 6a toward the front to switch on the main switch 6 to, for example, activate the electric motor 10. Analogously, pushing and/or sliding the start switch 5 toward the rear may correspondingly move the slide bar 8 toward the rear. As a result, the tension spring 9a along with the actuating bar 9 may also move toward the rear to tilt the switch lever 6a toward the rear side to, for example, switch off the main switch 6 and thus, for example, deactivate and/or stop the electric motor 10. FIG. 1 shows the main switch 6 as switched off with the electric motor 10 stopped.

A power cable 7 may be pulled out of and/or extend from the rear end of the rear case 3 to connect with a power source (not shown in the FIGS.) to supply power to the electric power tool 1 as needed.

As shown in FIG. 1, the electric motor 10 may include a tubular stator 11 that may surround a rotor 12 that may rotate relative to an inner circumference of the stator 11. The rotor 12 may be constructed from a main body section 12a that may accommodate coils wound around a rotor core (not shown in the FIGS.), a commutator 12b, and a rotary shaft 13. The rotary shaft 13 may be held in place and/or allowed to rotate via bearings 14, 15 located at a front end and a rear end of the rotary shaft 13, respectively. The commutator 12b may energize coils 32 wound around the main body section 12a when the main switch 6 is switched on. Also, the lead wires L1 and/or L2, to be further described later, may energize the coil 32 of the stator 11 to rotate the rotor 12. Further, a fan 16 may be attached to the rotary shaft 13 in, for example, front of the stator 11 to circulate air within the electric power tool 1 to cool the electric motor 10.

A front part of the rotary shaft 13 may enter into a gear case 4a of the gear head 4. A bevel gear 17 on the driving side may attach to a tip and/or end of the rotary shaft 13. Likewise, a bevel gear 18 on the driven side may engage with the bevel gear 17 on the driving side and may be fixed to the spindle 19. The spindle 19, as shown in FIG. 1, may be positioned perpendicular to the rotary shaft 13 and may be supported and/or allowed to rotate by the gear case 4a via bearings 22, 23 located at the upper and lower parts of the spindle 19. Further, a gear case cover 4b may cover a lower surface side of the gear case 4a. In detail, in an embodiment, the gear case cover 4b may be fixed to the gear case 4a by, for example, one or more screws (not shown in the FIGS.). Also, the gear case cover 4b may couple to and/or support the bearing 23. Further, as shown in FIG. 1, a lower portion of the spindle 19 may extend downwardly from the gear case cover 4b to, for example, attach to a circular grindstone 20. A grindstone cover 21 may be positioned to cover a rear half of the circumference of the grindstone 20.

Figure 2:
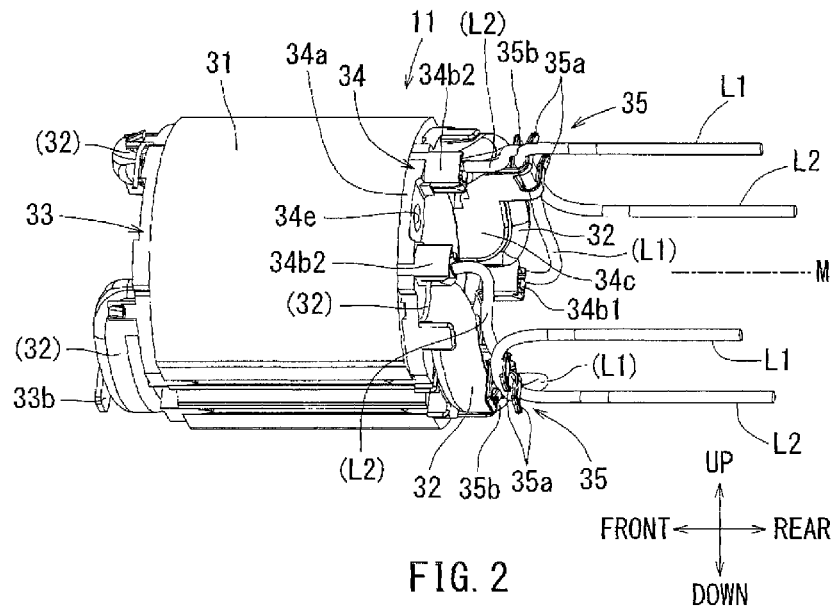
FIG. 2 illustrates a perspective view of a stator in accordance with an embodiment of the present invention.
Figure 3:
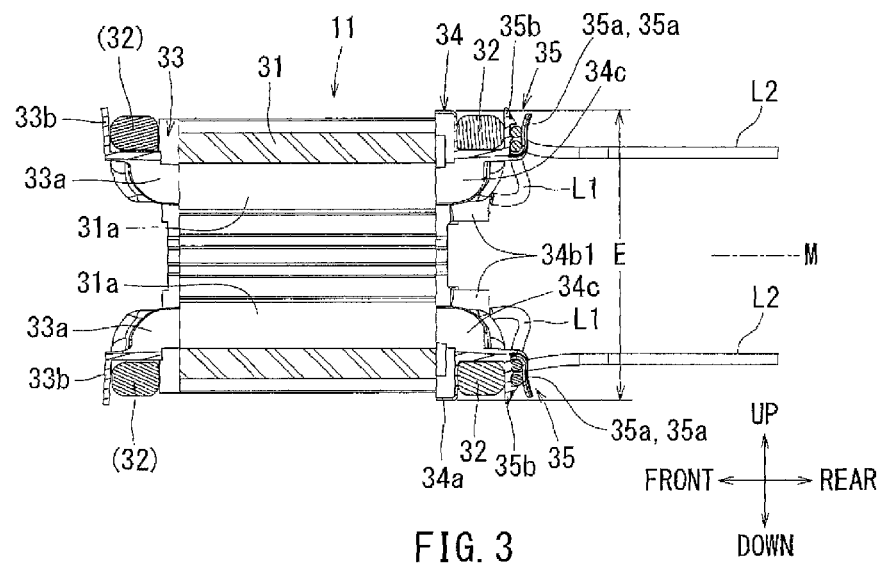
FIG. 3 illustrates a longitudinal sectional view of a stator in accordance with an embodiment of the present invention.

Possible configurations regarding how to arrange and/or connect lead wires L1, L2 will be explained in further detail as follows. Referring generally to FIGS. 2 and 3, a stator 11 is shown in accordance with an embodiment. The stator 11 of the electric motor 10 may enclose a tubular stator core 31 formed by, for example, laminating several thin steel sheets. Further, insulating members 33, 34, made from, for example, resin, may attach to front and rear end surfaces of the stator core 31. Also, two coils 32 may be wound around the inner circumference side of the stator core 31 via the insulating members 33, 34. Teeth 31a may be located in two positions to face each other along the inner circumference of the stator core 31. In an embodiment, the teeth 31a may be shaped as a circular-arc shape in accordance with a rotational direction of the rotor 12. Also, each of the coils 32 may be wound around the outer circumference side of the teeth 31a in a loop shape, for example. A portion of the coil 32 and/or the teeth 31a, wound as a loop as described above, may protrude from the front end and/or rear end of the stator core 31. The insulating members 33, 34 at the front and rear side may generally guide and/or restrict positioning of the protruding parts of the coils 32, may prevent interference with the rotor 12, and may insulate the coils 32 from the stator core 31.

Figure 4:
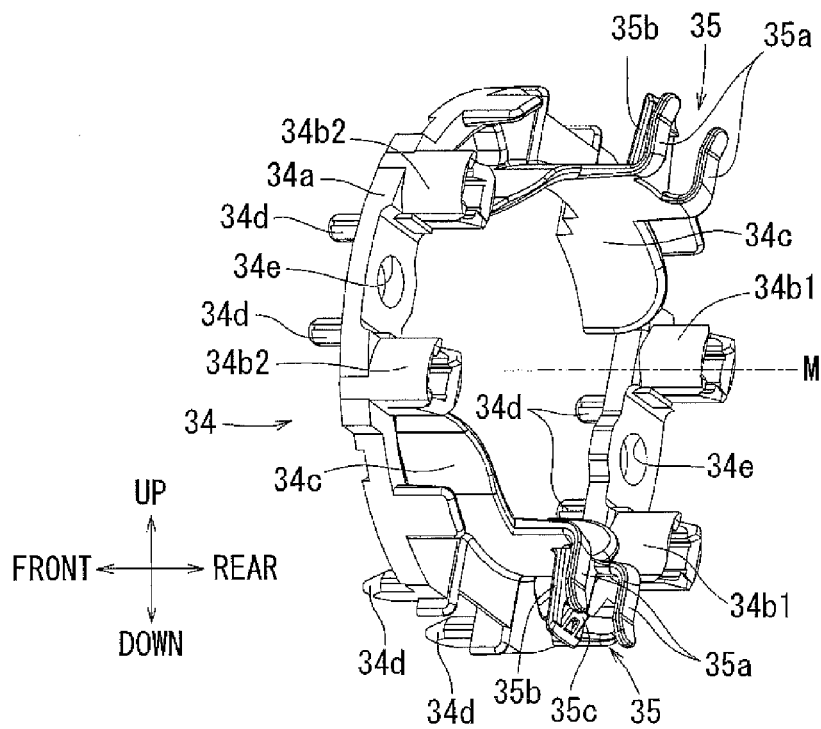
FIG. 4 illustrates a perspective view of an insulating member in accordance with an embodiment of the present invention.
Figure 5:
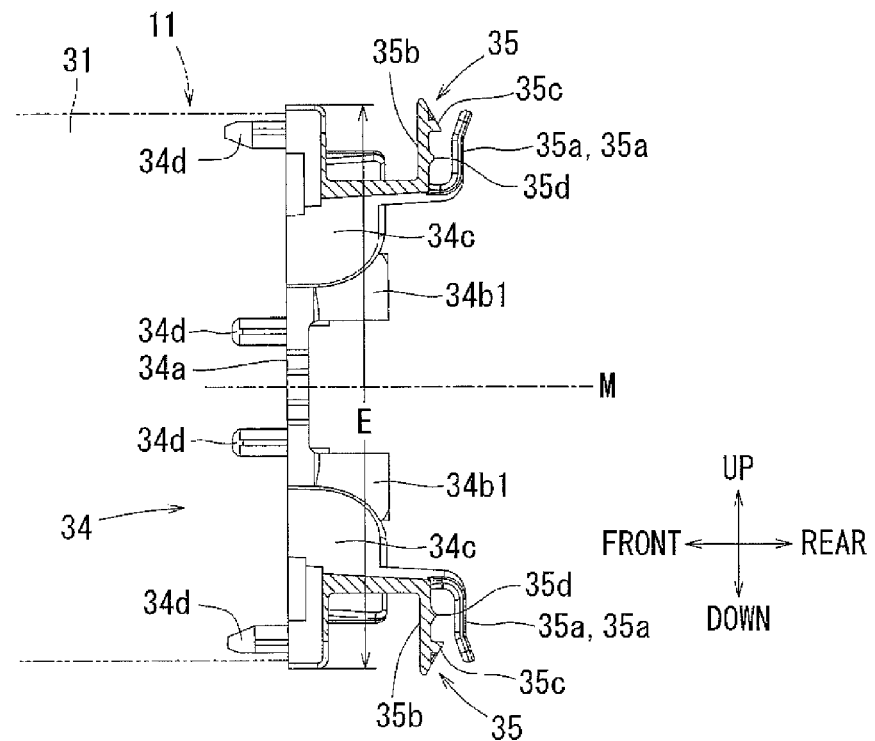
FIG. 5 illustrates a longitudinal sectional view of an insulating member in accordance with an embodiment of the present invention.
Figure 6:
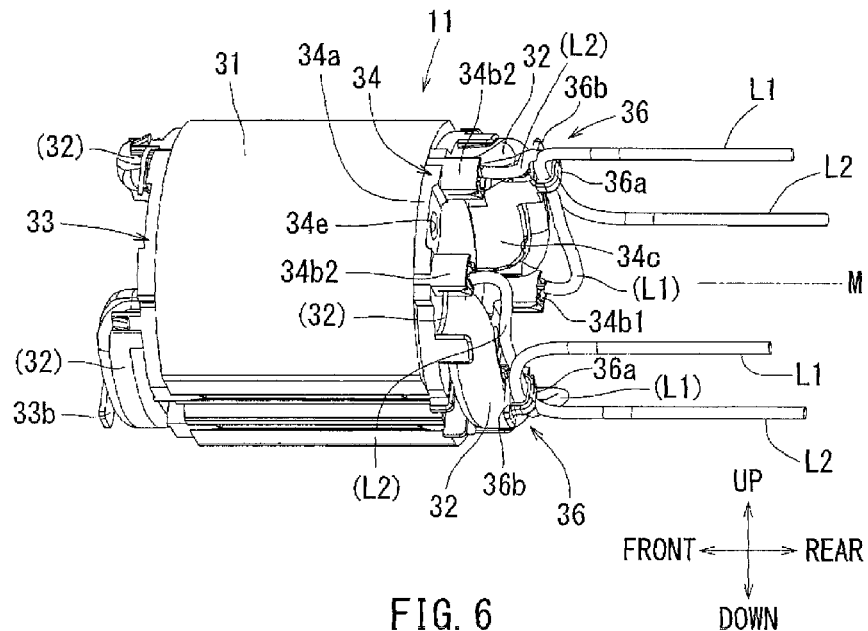
FIG. 6 illustrates a perspective view of a stator in accordance with another embodiment of the present invention.
Figure 7:
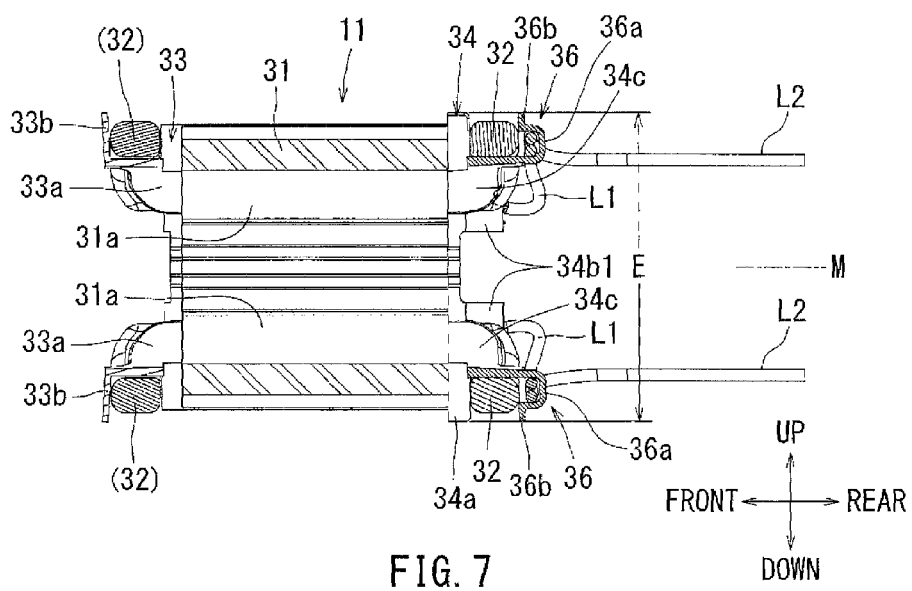
FIG. 7 illustrates a longitudinal sectional view of a stator in accordance with another embodiment of the present invention.
Figure 8:
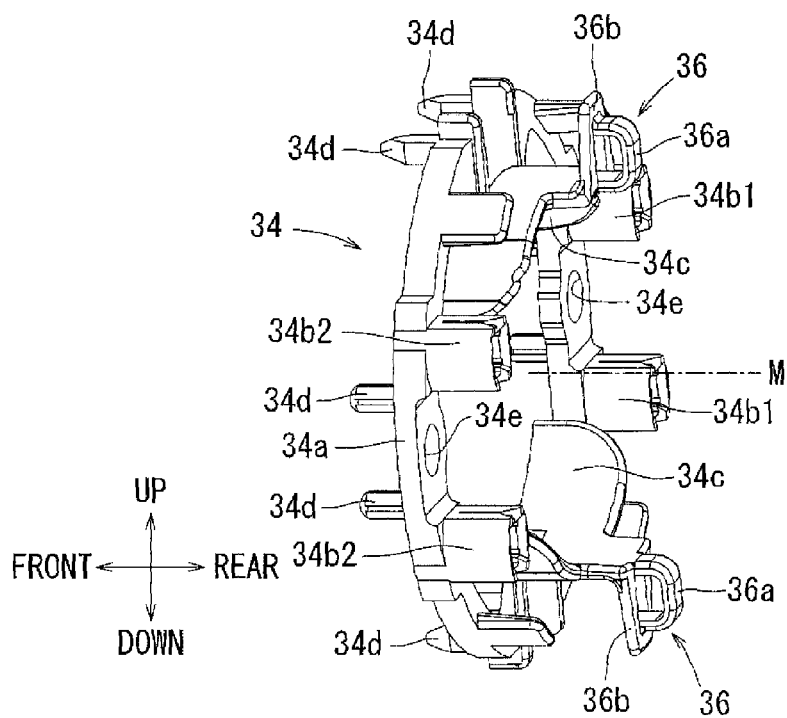
FIG. 8 illustrates a perspective view of an insulating member in accordance with another embodiment of the present invention.
Figure 9:
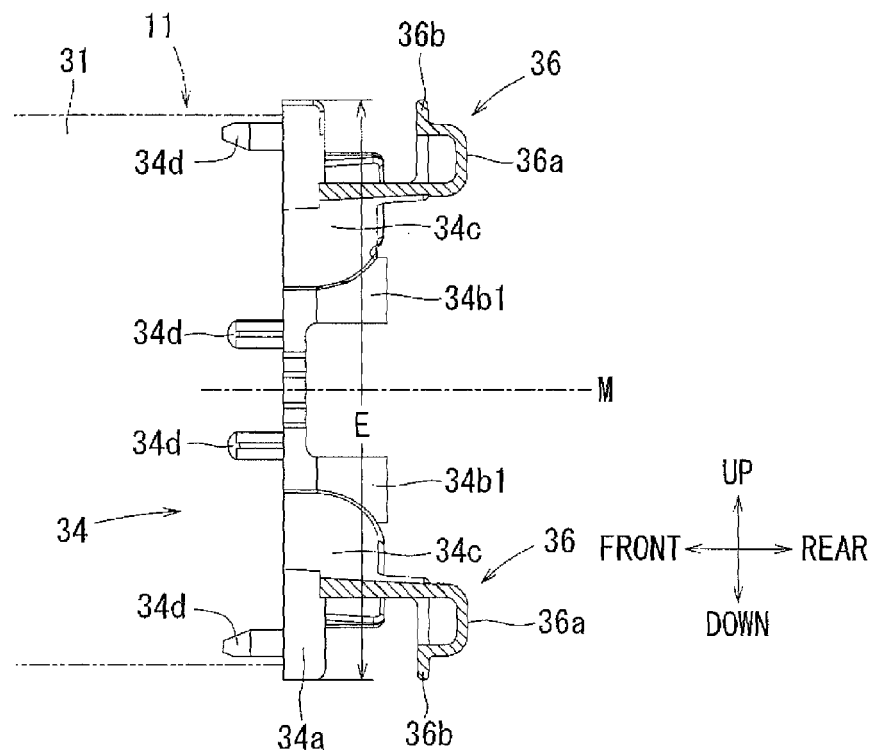
FIG. 9 illustrates a longitudinal sectional view of an insulating member in accordance with another embodiment of the present invention.

Each end section of the coil 32 may couple with and/or connect to the lead wires L1, L2 via the insulating member 34 located generally toward the rear of the electric power tool. FIGS. 4 and 5 show the insulating member 34 located toward the rear of the electric power tool 1. In an embodiment, the insulating member 34 may be molded from synthetic and/or natural materials such as resin. Further, the insulating member 34 may be assembled and/or constructed from a base part 34a generally formed in a circular ring shape, wire connecting parts 34b1, 34b2 to connect the lead wires L1, L2 to the coils 32 that may be wound around the teeth 31a of the stator core 31, coil-position-regulating portions 34c for guiding and/or restricting positioning of the protruding part of the coil 32 (an end part of the winding coil 32) that may protrude from an end surface of the stator core 21, and a wire holding part 35 to hold the lead wires L1, L2 in place as needed. As shown in FIGS. 4 and 5, a plurality of engaging protrusions 34d may be located on the front surface of the base part 34a, i.e., a front-facing contact surface with regard to the rear surface of the stator core 31, parallel to each other and extend in the front direction in. In an embodiment, engaging protrusions 34d may be formed integrally with the base part 34a. The insulating member 34 may be coupled with and/or linked to the rear surface of the stator core 31 by, for example, inserting and/or embedding the engaging protrusions 34d into engaging holes (not shown in the FIGS.) located on the rear surface of the stator core 31.

As shown in FIG. 2, the wire connecting parts 34b1, 34b2 to connect the two lead wires L1, L2 may be positioned in accordance with the two coils 32. In detail, two pairs of the wire connecting parts 34b1, 34b2 may be positioned within the insulating member 34. In an embodiment, a total of four wire connecting parts 34b1, 34b2 may be located on the rear surface of the base part 34a and extend outwards toward the rear of the electric power tool 1. As shown in, for example, FIG. 4, the wire connecting parts 34b1, 34b2 may be located on opposite sides in the circumferential direction with respect to the wire holding parts 35, which will be described in further detail later.

As shown in FIG. 2, the lead wire L1 may connect to the wire connecting part 34b1 and the lead wire L2 may connect to the wire connecting part 34b2. Further, although not shown in the FIGS., one end of the coil 32 may attach to the wire connecting part 34b1 and the other end of the coil 32 may connect to the wire connecting part 34b2 as needed. In an embodiment, the lead wire L1 may connect to an end of the coil 32 by inserting a terminal connected to the lead wire L1 into the wire connecting part 34b1. Similarly, the lead wire L2 may connect to an end of the coil 32 by inserting a terminal connected to the lead wire L2 into the wire connecting part 34b2.

As shown in FIG. 4, an insertion hole 34e may be formed in between the wire connecting parts 34b1. Further, another insertion hole 34e may be formed in between the wire connecting parts 34b2. Accordingly, screws (not shown in the FIGS.) insert into the insertion holes 34e to attach the insulating member 34 to the stator core 31 and/or to the main case 2 as needed.

Now referring generally to FIG. 5, two coil-position-regulating portions 34c may extend rearward toward the motor axis M to function as a wall that may guide and/or regulate the position of the coil 32. In detail, the two coil-position-regulating portions 34c may be positioned along a rear end section of the teeth 31a of the stator core 31. As shown in FIGS. 4 and 5, for example, the two coil-position-regulating portions 34c may be positioned along the inner circumference of the base part 34c and may face to each other. Also, the two coil-position-regulating portions 34c may extend from an upper and a lower position of the insulating member 34 in the rear direction. Further, the two coil-position-regulating portions 34c may have a circular arc shape according to the inner circumference of the base part 34a to better accommodate and/or direct the coils 32 as needed. As shown in FIG. 3, the coil 32 may be wrapped and/or wound around the outer circumference of the two coil-position-regulating portions 34c to be, for example, prevented from entering into the inner circumference side of the two coil-position-regulating portions 34 to potentially interfere with movement and/or rotation of the rotor 12. Further, two coil-position-regulating portions 33a may be located toward the front of the insulating member 33 to also prevent the coil 32 from, for example, inadvertently moving about during operation of the electric power tool 1 to potentially interfere with the rotor 12.

Further, each of the wire holding parts 35 may be located on the rearward side of the coil-position-regulating portion 34c. As shown in FIG. 4, for example, each of the wire holding parts 35 may have two rear holding parts 35a and one front holding part 35b. In an embodiment, the front holding part 35b and the two rear holding parts 35a may collectively form and/or be shaped generally as a clip, for example, to hold and/or direct a wire as needed. In detail, the rear holding parts 35a and the front holding part 35b may be integrally formed with the coil-position-regulating portion 34c and may be generally curved in a "L"-type shape to protrude radially outward from the rear part of the coil-position-regulating portion 34c. As shown in FIG. 5, the rear holding part 35a may be positioned behind of the front holding part 35b, to, as discussed earlier form a clip with the front holding part 35b that may open outwardly in the radial direction of the stator core 31.

As shown in FIG. 4, the rear holding parts 35a may be positioned in parallel with each other and extend a fixed distance from the circumference of the base part 34a. Further, as shown in FIG. 5, an end tip of each of the rear holding parts 35a may be slightly tilted and/or bent, to some extent, in the rear direction to assist in receiving a wire, for example. Further, the front holding part 35b may be located behind and/or in between the two rear holding parts 35a when viewed from the direction of the motor axis M. In detail, the front holding part 35b, as well as the rear holding part 35a, may be tilted and/or bent in a L-shape outwardly extending in the radial direction. As shown in FIG. 5, a claw part 35c configured to hook and/or engage with the lead wire may extend from the rear side of the front holding part 35b. Further, as shown in FIG. 5, a ridge and/or protrusion 35d may be located at the middle of the front holding part 35b on the rear side thereof to position and/or prevent unwanted slippage, for example, of the lead wire L1, L2.

As shown in FIGS. 3 and 5, the rear holding parts 35a and the front holding part 35b may be generally curved in a "L"-shape to extend outwardly in the radial direction such that the rear holding parts 35a and the front holding part 35b may not substantially exceed beyond the outer diameter E of the base part 34a. In an embodiment, the front holding part 35b may function as a regulating plate to direct an automatic winding process of the coil 32. In detail, in an embodiment, the front holding part 35b may be used as a regulating plate for the automatic winding process of the coil 32 with regard to the teeth part 31a of the stator core 31 and the coil-position-regulating portion 34c of the insulating member 34. As shown in FIG. 3, regulating plates 33b may be located to extend outwardly in the radial direction at the front side of the coil-position-regulating portion 33a.

As shown in FIGS. 2 and 3, the two lead wires L1, L2, for example, may be held in place as needed between the rear holding parts 35a and the front holding part 35b. Further, the two lead wires L1, L2 may be positioned and/or held from above the rear holding parts 35a and the front holding part 35b in the radial direction. Further, and as shown in the FIGS., the two lead wires L1, L2 may be pulled in from both right and left sides of the wire holding part 35 and held, for example, to cross to each other. Moreover, the lead wires L1, L2 may be held by the flexibility and/or elasticity of the rear holding parts 35a and the front holding part 35b. Also, the claw part 35c of the front holding part 35b and the protrusion 35d may hold and/or prevent unwanted movement of the two lead wires L1, L2. As shown in FIG. 5, two lead wires L1, L2 held, for example, in between the rear holding parts 35a and the front holding part 35b may be moved and/or positioned as needed within the outer diameter E of the base part 34a.

As discussed above, four lead wires, for example, L1, L2 as shown in FIGS. 2 and 3, may electrically connect to the coil 32 and may be held in place as needed by each of the wire holding parts 35. Moreover, and as discussed above, each of the wire holding parts 35 may have two rear holding parts 35a and one front holding part 35b. The lead wires L1, L2 may be held by each of the wire holding parts 35 by, for example, fitting the two lead wires L1, L2 between the two rear holding parts 35a and the front holding part 35b. As a result, compared to the conventional method of bundling the lead wires with strings, effort associated with the placement and/or holding of the lead wires L1, L2 with respect to the insulating member 34 may be reduced. Further, as discussed above, the lead wires L1, L2 may be held between the rear holding parts 35a and the front holding part 35b by fitting them from above (i.e. upwards) in the radial direction. In this respect, effort needed for sliding into place, configuring and/or holding the lead wires L1, L2, and also assembling the electric motor 10 as a whole may be reduced and/or simplified.

Further, as discussed above, the wire holding parts 35 may be positioned within, and/or may be positioned so as not to substantially extend beyond, the outer diameter E of the base part 34a of the insulating member 34 when viewed from the motor axis M. Thus, as made possible by the configuration of the wire holding parts 35 with respect to the base part 34a and/or the insulating member 34, the lead wires L1, L2 may be generally wound about the electric motor 10 in a streamlined fashion without creating bulk around the stator 11, i.e. such that the lead wires L1, L2 do not greatly add to the width and/or bulk of the electric motor 10 as a whole.

Further, as discussed above, the wire connecting parts 34b1, 34b2 may be positioned opposite each other generally along the circumferential of the wire holding part 35. In an embodiment, the two lead wires L1, L2 may be held in place to cross each other and/or connect to the wire connecting parts 34b1, 34b2 By this configuration, the lead wires L1, L2 may be led and/or guided close to the wire connecting parts 34b1, 34b2 without, for example, extending from the insulating member 34 in the radial direction. Further, the two rear holding parts 35a may be positioned in parallel at a fixed distance along the circumference of the base part 34a. By this configuration, the two lead wires L1, L2 may be generally oriented and/or guided toward the rear of the electric power tool 1 as needed.

The present invention is not limited to the above-described embodiment and may be further modified without departing from the scope and spirit of the present invention. For example, in an embodiment, the clip, defined by the two rear holding parts 35a and the front holding part 35b, may open outwardly in the radial direction of the stator core 31, which may be formed as the wire holding part 35. However, the wire holding part 35 may be formed and/or constructed in accordance with other embodiments, for example. In detail, FIGS. 6-9 show a modified wire holding part 36 associated with the stator 34 and the insulating member 34. Like reference numerals are used with respect to like portions and configurations, thus repetitive descriptions thereof may be omitted. In an embodiment shown in FIGS. 2-5, the wire holding part 35 may generally be formed as a clip that may open outwardly in the radial direction. In detail, the wire holding part 35 may receive and/or accommodate the two lead wires L1, L2 from, for example, outside the wire holding part 35 in the radial direction.

In contrast, a wire holding part 36 in another embodiment may have a holding part 36a formed generally in a closed circular ring shape. In detail, the holding part 36a of the wire holding part 36 may be formed integrally with a mounting part 36b that may function as, for example, a regulating plate for the automatic winding process. According to the wire holding part 36 of this embodiment, the end parts of the lead wire L1, L2, may insert through and be held by the inner circumference of the holding part 36a to connect to the wire connecting parts 34b1, 34b2. Thus, the lead wire L1 may insert, for example, from one direction generally in the circumferential direction with respect to the holding part 36a, and the lead wire L2 may be inserted from the opposite and/or another direction. In this way, the two lead wires L1, L2 may be held to cross and/or overlap with each other in the wire holding part 36 as needed similar to the configuration shown in other embodiments, for example.

As shown in FIGS. 6-9, the wire holding part 36 may be positioned within the outer diameter E of the base part 34a of the insulating member 34 when viewed from the motor axis M of the stator core 31, similar to that shown and discussed in earlier embodiments. Such a configuration may allow for the lead wires L1, L2 to be positioned and/or held close to the stator 11 such that the total distance of the electric motor 10 may not be enlarged in the radial direction.

Further, in an embodiment shown by FIGS. 6-9, the lead wires L1, L2 may be held in place as needed with respect to the insulating member 34 by, for example, threading and/or inserting the lead wires L1, L2 through the inner circumference of the loop-shaped holding part 36a. Such engagement of the lead wires L1, L2 with the insulating member 34, as described above may be relatively easier in comparison to conventional methods of first binding lead wires by string for later attachment to a protruding portion of the coil, for example. Accordingly, the stator 11, and also the electric motor 10 may be rapidly and easily assembled.

In detail, in an embodiment shown by FIGS. 6-9, the lead wires L1, L2 may be inserted through and held in place as needed by the inner circumference of the holding part 36a that may be integrally formed with the mounting part 36b in, for example, a closed loop-shape. Thus, the lead wires L1, L2 once positioned and/or held in place as described above may be prevented from inadvertently slipping out of the wire holding part 36 to, for example, potentially interfere with operation of the stator 11 and/or rotor 13.

Further, different from one or more of the embodiments discussed above, the lead wires L1, L2 may be held to cross each other through the inner circumference of, for example, a single holding part 36a in the embodiment. Moreover, the two lead wires L1, L2 may be pulled out in parallel from the electric power tool 1 in the rear direction over, for example, a small distance. Also, the two lead wires L1, L2 may be easily bound together. Thus, for at least several of the reasons discussed above, the lead wires L1, L2 may be easily routed through the single holding part 36a to be held in place as needed.

Figure 11:
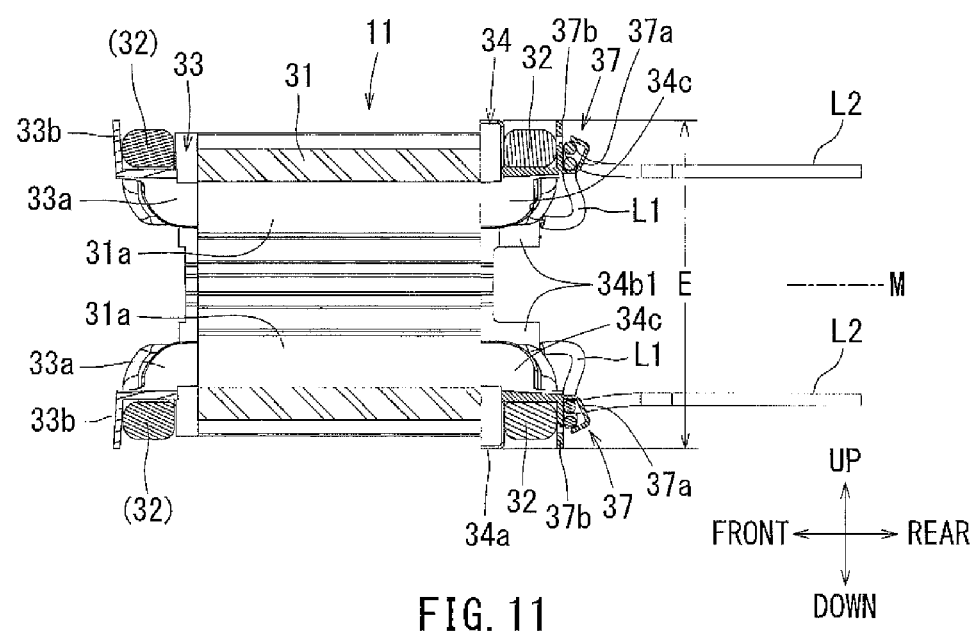
FIG. 11 illustrates a longitudinal sectional view of a stator in accordance with yet another embodiment of the present invention.
Figure 12:
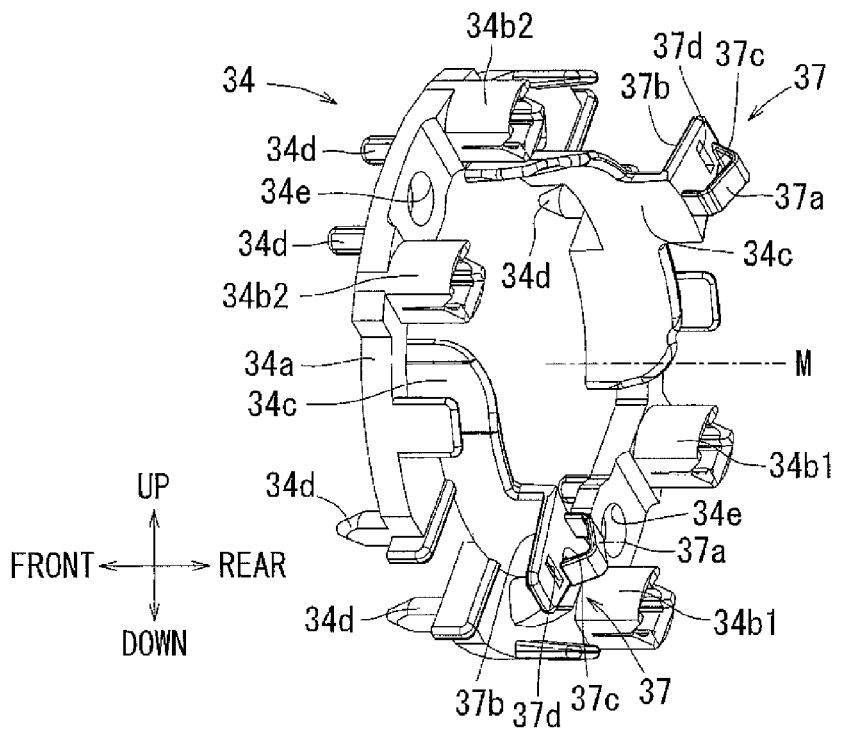
FIG. 12 illustrates a perspective view of an insulating member in accordance with yet another embodiment of the present invention.
Figure 13:
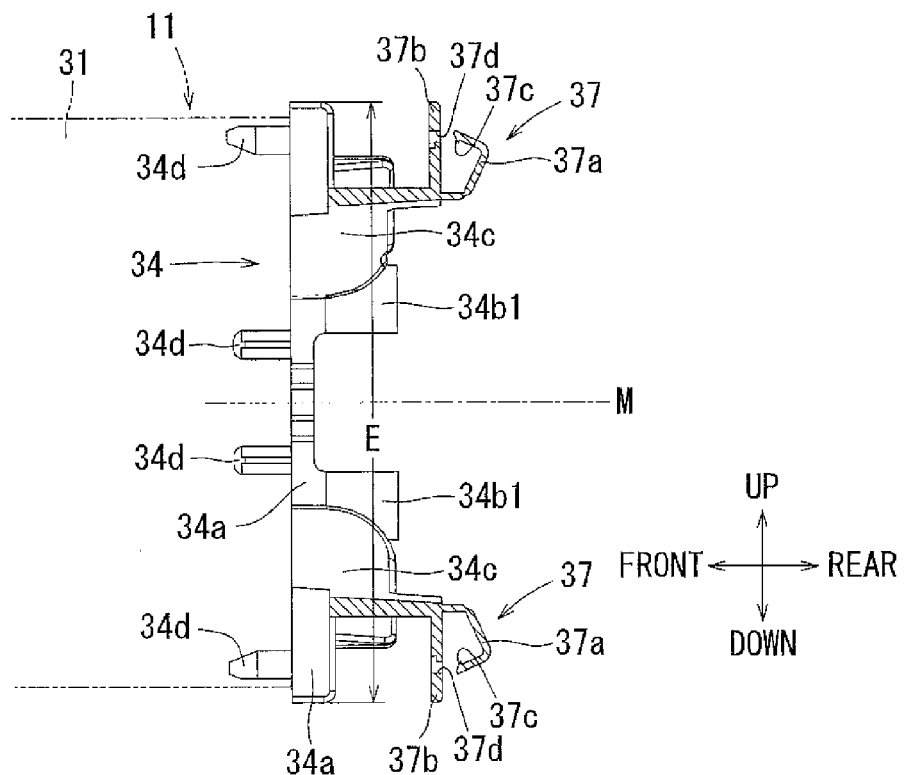
FIG. 13 illustrates a longitudinal sectional view of an insulating member in accordance with yet another embodiment of the present invention.
Figure 14:
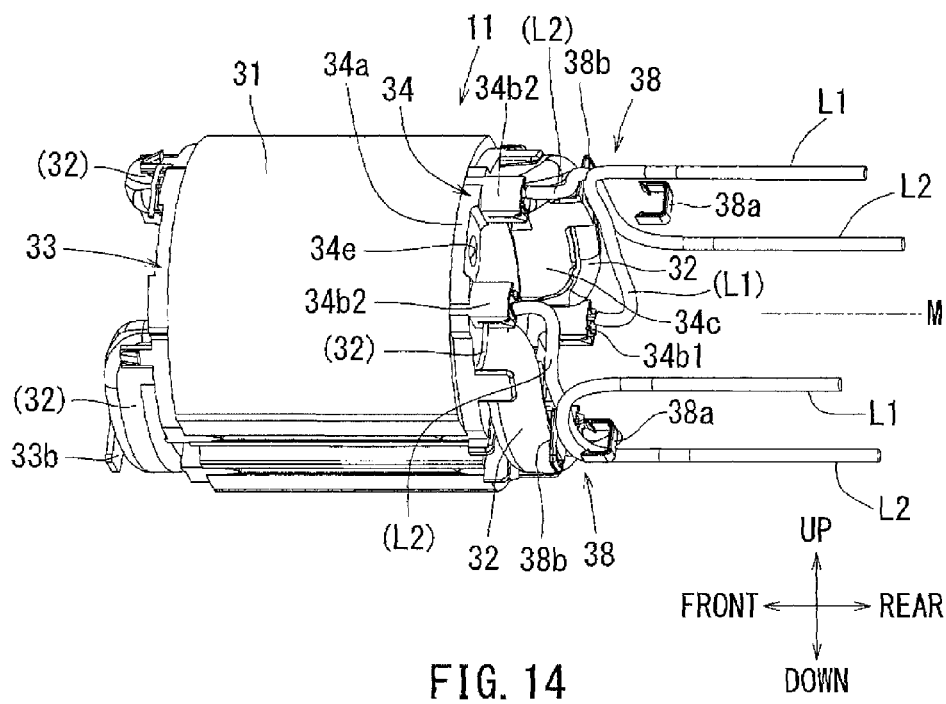
FIG. 14 illustrates a perspective view of a stator in accordance with yet another embodiment of the present invention.

FIGS. 10-13 show wire holding parts 37 in accordance with yet another embodiment. The wire holding parts 37 may be modified based on the wire holding parts 36 of one or more of the embodiments discussed earlier. Each wire holding part of the wire holding parts 37 of the embodiment shown in FIGS. 10-13 may have an opening/closing type holding part 37a. As shown in FIG. 13, a regulating plate 37b, which may also used in an automatic winding process of the coil 32, may connect with and/or support the holding part 37a such that the holding part 37a may be either opened or closed. Further, the holding part 37a may be integrally formed with the regulating plate 37b. In an embodiment, the holding part 37a may be flexible and thus open outwardly in the radial direction. Further, an engaging claw 37c may extend from a tip of the holding part 37a as shown in FIG. 13, for example. Further, the regulating plate 37b may have an engaging hole 37d configured to receive the engaging claw 37c.

Figure 10:
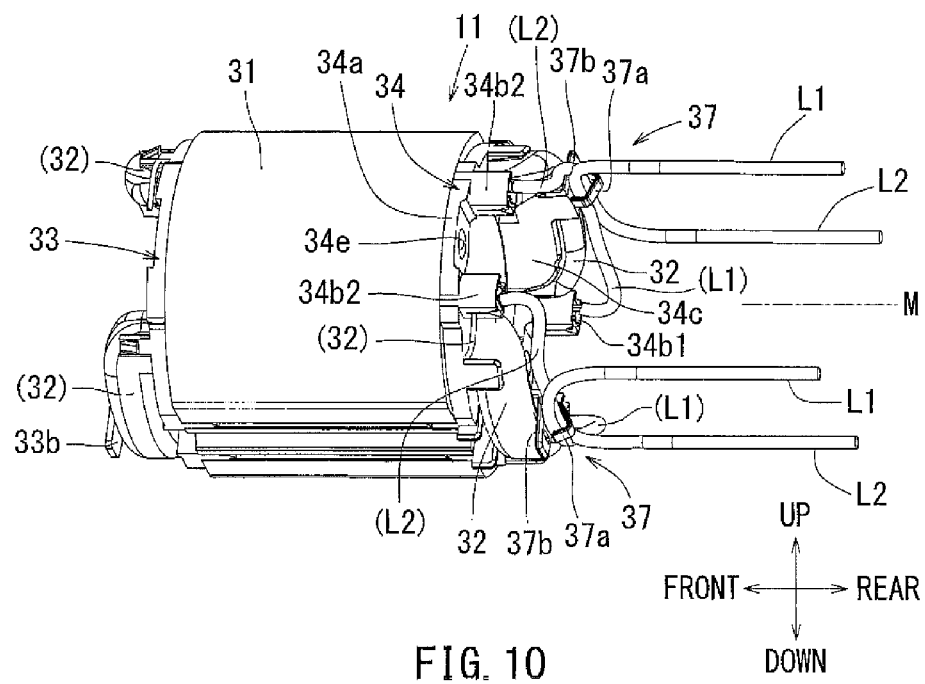
FIG. 10 illustrates a perspective view of a stator in accordance with yet another embodiment of the present invention.

As shown in FIGS. 12 and 13, the holding part 37a may open outwardly, i.e. away from the regulating plate 37b, in the radial direction. The two lead wires L1, L2 may be inserted between the holding part 37a and the regulating plate 37b from outside in the radial direction to cross each other as shown in FIGS. 10 and 11, for example. Further, the two lead wires L1, L2 may be held in place as needed by closing, such as elastically closing, the holding part 37a. In detail, the engaging claw 37c may be inserted into and engaged with the engaging hole 37d of the regulating plate 37d to hold the lead wires L1, L2 in place within the wire holding part 37 as needed.

The wire holding part 37, according to the embodiment shown in FIGS. 10-13, may be positioned within the outer diameter E of the base part 34a of the insulating member 34 when viewed from the motor axis M of the stator core 31. Such a configuration may be similar to that shown for the wire holding part 35 and/or the wire holding part 36 as discussed in earlier embodiments, for example. Such a configuration as discussed here and earlier, i.e. where the wire holding part 37 is positioned within the outer diameter E, may allow for the lead wires L1, L2 to be directed as needed without creating bulk around the electric motor 10 in the radial direction as opposed to a conventional arrangement where the lead wires L1, L2 may be directed through a separate clip that may protrude from the stator 11, for example. Further, as discussed here, the lead wires L1, L2 may be held in place as needed with respect to the insulating member 34 by closing the holding part 37a with respect to the regulating plate 37b. Thus, when compared to a conventional method of binding the lead wires by string and to fix the lead wires to a protruded portion of the coil, the effort needed to hold the lead wires L1, L2 in place may be greatly reduced. Accordingly, the stator 11, and the electric motor 10 may be rapidly and easily assembled.

Figure 15:
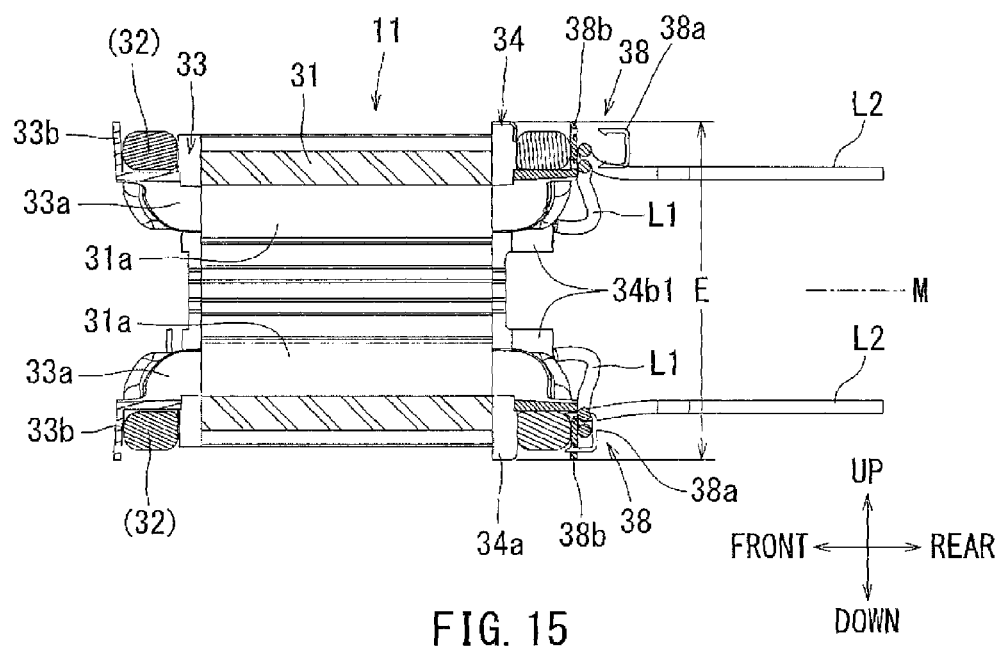
FIG. 15 illustrates a longitudinal sectional view of a stator in accordance with yet another embodiment of the present invention.
Figure 16:
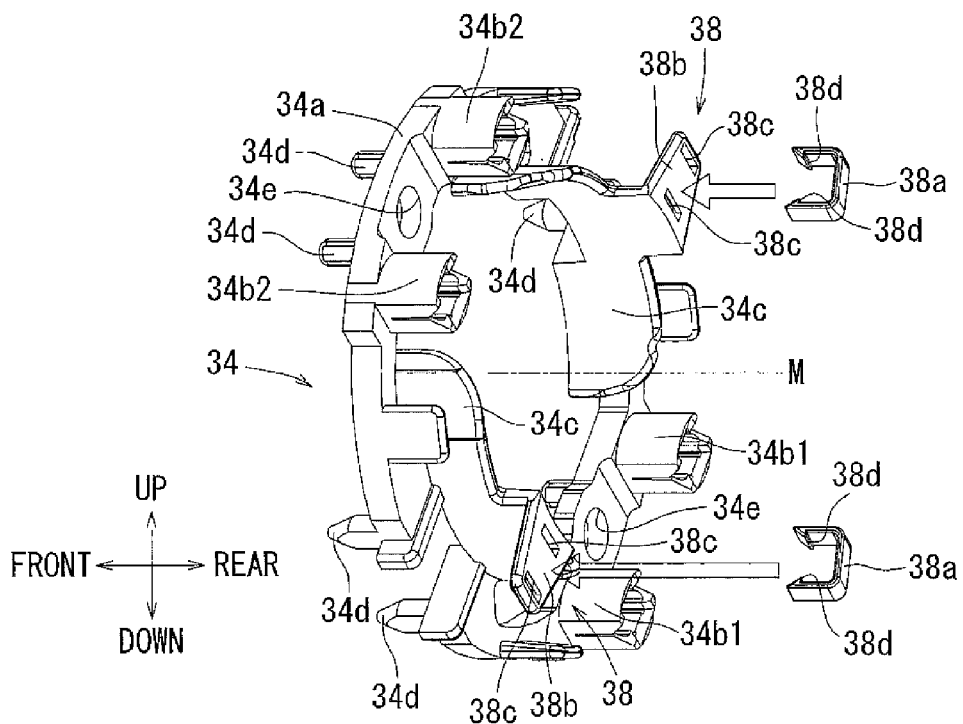
FIG. 16 illustrates a perspective view of an insulating member in accordance with yet another embodiment of the present invention.
Figure 17:
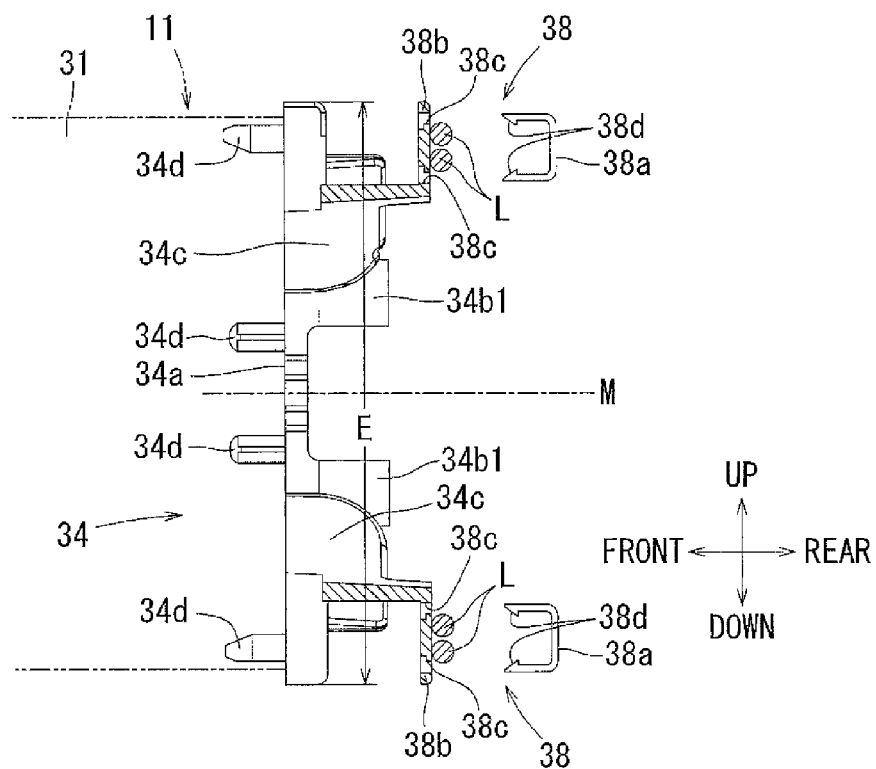
FIG. 17 illustrates a longitudinal sectional view of an insulating member in accordance with yet another embodiment of the present invention.

FIGS. 14-17 show wire holding parts 38 with a detachable holding part 38a according to yet another embodiment. In detail, the holding part 38a may be a U-shaped stopper formed from a material with elastic properties such as composite, resin and/or metal. Thus, holding part 38a may be manipulated to attach to or detach from the regulating plate 38b used to assist in an automatic winding process of the coil 32. Also, as shown in FIGS. 16-17, engaging claws 38d may extend from both ends of the holding part 38a. Further, two engaging hole 38c may be formed in the regulating plate 38*b* in correspondence with the engaging claws 38*d* of the holding part 38*a*.

In the embodiment shown by FIGS. 14-17, the two engaging claws 38*d* may insert into and/or engage with the corresponding engaging holes 38*c* to attach the holding part 38*a* to the rear surface of the regulating plate 38*b*. In detail, the two lead wires L1, L2 may be positioned on the rear surface of the regulating plate 38*b*. Then, the holding part 38*a* may insert into and/or attach with the regulating plate 38*b* to hold the two lead wires L1, L2, which may cross each other, in place as needed. In detail, the insulating member 34 may hold the two lead wires L1, L2 in place as needed upon insertion of the holding part 38*a* with the engaging claws 38*d* through the corresponding engaging holes 38*c* in the regulating plate 38*d*. Specifically, the engaging claws 38*d* may engage with the engaging holes 38*c* to hold the two lead wires L1, L2 in place. Analogously, the holding part 38 may be removed from the regulating plate 38*b* by detaching the engaging claws 38*d* from the engaging holes 38*c* to accommodate removal and/or replacement of the two lead wires L1, L2.

As shown in FIG. 15, the wire holding part 38 according to the embodiment shown in FIGS. 14-17 may be located within the outer diameter E of the base part 34*a* of the insulating member 34 when viewed from the motor axis M of the stator core 31 Such a configuration as discussed here and earlier, i.e. where the wire holding part 38 is positioned within the outer diameter E, may allow for the lead wires L1, L2 to be directed as needed without creating bulk around the electric motor 10 in the radial direction as opposed to a conventional arrangement where the lead wires L1, L2 may be directed through a separate clip that may protrude from the stator 11, for example.

Further, as discussed above, insertion of the engaging claws 38*d* into the engaging holes 38*c* may attach the holding part 38*a* to the rear surface of the regulating plate 38*b* to hold the two lead wires L1, L2 in place as needed with respect to the insulating member 34. Thus, when compared to a conventional method of binding the lead wires by strings to fix the wires to a protruded portion of the coil, overall effort associated with holding the lead wires L1, L2 in place may be reduced. Accordingly, the stator 11, and the electric motor 10 may be rapidly and easily assembled.

The various embodiments discussed above may be further modified. For example, the two lead wires L1, L2 may be held by one or more of the wire holding parts 35, 36, 37, or 38. Also, only a single lead wire L1 or L2 may be held, or, alternatively, more than two lead wires L1, L2 such as three or more lead wires may be held by one or more of the wire holding parts 35, 36, 37, or 38.

Further, in the various embodiments discussed above, the stator 11 may have two coils 32 and four lead wires which may all be arranged and/or connected using the two wire holding parts 35. However, more than two wire holding parts 35 (36, 37, 38) may be positioned and used according to lead wires.

Moreover, in the embodiments discussed above, the wire holding parts 35 (36, 37, 38) may be positioned on the rear side of the insulating member 34 when viewed from the motor axis M. In another embodiment, for example, the wire holding parts 35 (36, 37, 38) may be positioned on the front side of the insulating member 33 or on both the front and rear sides of the insulating member 33, 34.

Even further, in the embodiments discussed above, the electric motor 10, i.e. having a rotor 12 extending lengthwise within the electric motor 10, may have the rotor 12 positioned along the inner circumference of the tubular stator 11 fixed to the main case 2. However, and in alternative to the configuration discussed earlier, the electric motor 10 may have the rotor 12 positioned outside and/or along an exterior circumference of the tubular stator 11. Moreover, one or more of the embodiments discussed above may be used in conjunction with a rotor having a permanent magnet embedded in a rotor core.

Further, the above embodiments generally present the electric power tool 1 to be a disc grinder, for example. However, the electric power tool 1 may be, for example a screwdriver, cutter and/or any other type of electric power tool 1. Further, the electric motor 10 may be configured within the electric power tool 1 accordingly, i.e. as needed for a screwdriver, cutter and/or any other type of electric power tool 1 etc.

What is claimed is:

1. An electric motor comprising:
   a stator positioned lengthwise within and fixed to a case wherein the stator has a stator core, a coil wound around a tooth extending from the stator core, and an insulating member attached to the stator core wherein the insulating member is configured to insulate the coil from the stator core;
   a wire holding part extending from the insulating member wherein the wire holding part is configured to hold a wire substantially within an outer diameter of the insulating member to permit the wire to connect with a wire connecting part formed in the insulating member; and
   a rotor positioned lengthwise along an inner circumference of the stator wherein the rotor is configured to rotate about a motor axis extending lengthwise across the electric motor,
   wherein the wire holding part further comprises:
      a coil regulating part to regulate the position of the coil along the motor axis; and
      a holding part for fitting the wire between the holding part and the coil regulating part wherein the holding part faces the coil regulating part along the motor axis when viewed along the motor axis such that the wire in the holding part cannot be moved to be released from the holding part along the motor axis.

2. The electric motor of claim 1, wherein the wire connecting part extending from the insulating member and further wherein the wire connecting part is configured to permit the wire to connect to the coil.

3. The electric motor of claim 1, wherein the wire holding part is a clip that protrudes outwardly in the radial direction of the stator core.

4. The electric motor of claim 1, wherein the holding part is configured to be a curved member to hold the wire within an inner circumference thereof.

5. The electric motor of claim 4, wherein the curved member is configured to open and close.

6. The electric motor of claim 4, wherein the curved member is configured to be detachable.

7. The electric motor of claim 1, wherein the wire holding part is configured to hold more than one wire.

8. The electric motor of claim 1, wherein the wire holding part is integrally formed with the insulating member.

9. An electric power tool comprising the electric motor of claim 1.

10. The electric motor of claim 1, wherein the holding part is integrally formed with the coil regulating part.

11. The electric motor of claim 1, wherein the wire holding part holds the wire by elasticity thereof in a fitting manner.

12. The electric motor of claim 1, wherein an end tip of the holding part is bent outward in a direction of the motor axis.

13. The electric motor of claim 1, wherein the coil regulating part includes a claw part that is configured to hook the wire.

14. The electric motor of claim 1, wherein the wire holding part includes two holding parts and one coil regulating part.

15. The electric motor of claim 1, wherein the one coil regulating part is located between the two holding parts when viewed from a direction of the motor axis.

16. The electric motor of claim 1, wherein the coil regulating part includes a protrusion that positions and prevents slippage of the wire.

17. The electric motor of claim 1, wherein the holding part allows for the wire to be moved along the motor axis while still being held within the holding part.

18. The electric motor of claim 1, wherein:
the holding part includes an opening for releasing the wire from the holding part such that, in order to remove the wire, the wire is moved through the opening, and
the opening is positioned so that moving the wire in a direction that is along the motor axis does not remove the wire from the holding part.

19. An electric motor comprising:
a stator positioned lengthwise within and fixed to a case wherein the stator has a stator core, a coil wound around a tooth extending from the stator core, and an insulating member attached to the stator core wherein the insulating member is configured to insulate the coil from the stator core;
a wire holding part extending from the insulating member wherein the wire holding part is configured to hold a wire substantially within an outer diameter of the insulating member to permit the wire to connect with a wire connecting part formed in the insulating member; and
a rotor positioned lengthwise along an inner circumference of the stator wherein the rotor is configured to rotate about a motor axis extending lengthwise across the electric motor,
wherein the wire holding part further comprises:
a coil regulating part to regulate the position of the coil along the motor axis; and
a holding part for fitting the wire between the holding part and the coil regulating part,
wherein the wire is held between an inner circumference of the holding part and the coil regulating part by two ends of the holding part to the coil regulating part being attached on opposing sides of the wire so that the wire in the holding part cannot be released from the holding part in a direction along the motor axis.

20. The electric motor of claim 19, wherein the two ends of the holding part are attached to hold the wire in place with respect to the insulating member by closing one of the ends of the holding part with respect to the coil regulating part.

* * * * *